INVENTOR
LEONARD E. SAGER
BY
Lester W Clark
AGENT

Feb. 9, 1954 L. E. SAGER 2,668,697
DENSITY RESPONSIVE VALVE FOR CARBURETORS
Filed Dec. 13, 1945 2 Sheets-Sheet 2
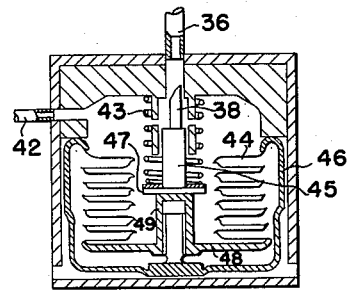
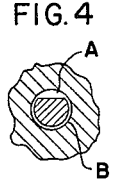
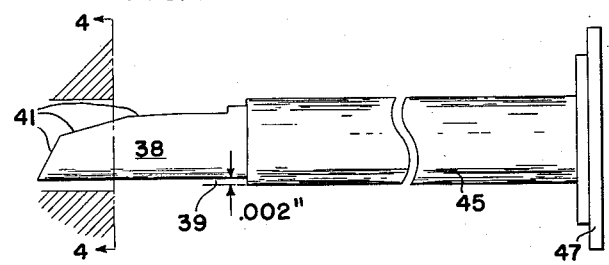
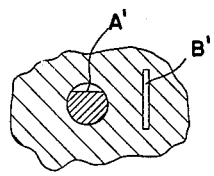
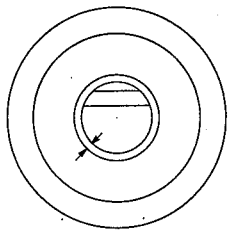
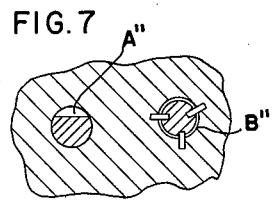
INVENTOR
LEONARD E. SAGER
BY Lester W Clark
AGENT

Patented Feb. 9, 1954

2,668,697

UNITED STATES PATENT OFFICE 2,668,697

DENSITY RESPONSIVE VALVE FOR CARBURETORS

Leonard E. Sager, Dayton, Ohio, assignor, by mesne assignments, to Niles-Bement-Pond Company, West Hartford, Conn., a corporation of New Jersey Application December 13, 1945, Serial No. 634,836

12 Claims. (Cl. 261—39)

The present invention relates to carburetors for internal combustion engines, and to apparatus for correcting the operation of carburetors and other fluid flow measuring devices for variations in the temperature of the fluid being measured.

A carburetor for an internal combustion engine is required to maintain a controlled proportional relationship between the rate of flow of air to the engine and the rate of flow of fuel to the engine. In other words, the carburetors must control the fuel-to-air ratio. Since the fuels commonly used are of relatively constant density, while the density of the air varies with its pressure and temperature, it is necessary that the carburetor include a device which compensates its action for variations in air temperature and pressure. It is common to use a flexible bellows filled with a fluid having an appreciable temperature coefficient of expansion for that purpose.

Such a bellows is sealed, and contracts when the external pressure increases and expands when the external pressure decreases. The volume of the bellows is therefore greater at low pressures than it is at high pressures. Because of this greater volume at low pressures, the bellows tends to be more sensitive to temperature changes at low pressures than at high pressures.

Under conditions commonly encountered in the use of aircraft carburetors, high pressure and high temperature conditions usually occur together, whereas low pressure and low temperature conditions likewise occur together. In such carburetors the pressure and temperature responsive bellows is commonly used to position a contoured valve controlling the flow of air thru a second pressure control conduit.

In order to improve the temperature sensitivity of such a pressure and temperature responsive device, I propose, in accordance with the present invention, to provide, in parallel with the contoured valve, a restriction of substantially fixed dimensions having opposed walls spaced from each other by a distance sufficiently small so that the elastic fluid flow between them is substantially affected by changes in viscosity and hence by changes in the temperature of the flowing fluid. When an elastic fluid, such as air, flows through a conduit whose walls are spaced apart by an extremely small distance, the fluid obeys the law of laminar flow which is quite different from the law of turbulent flow that obtains when the conduit walls are spaced a greater distance apart. When an elastic fluid, such as air, flows according to the law of turbulent flow, its viscosity is not a factor and does not enter into the equations governing such flow. On the other hand, when an elastic fluid, such as air, flows according to the law of laminar flow, its viscosity is a substantial factor and is included in the equations governing such flow; and it is the inclusion of viscosity as a factor that chiefly distinguishes the law of laminar flow from the law of turbulent flow of elastic fluids, such as air. It has been further determined that for an elastic fluid, such as air, its viscosity increases with its increase in temperature, whereas for an inelastic fluid (i. e., liquid) its viscosity decreases with its increase in temperature. Accordingly, the laminar flow of elastic fluids is quite different from liquid flow and also from the usual turbulent flow of elastic fluids, chiefly in that for elastic fluid laminar flow, the velocity decreases with increase in temperature, and vice versa, whereas the opposite is true of liquid flow, and for elastic fluid turbulent flow, the velocity is unaffected by variations in temperature. Where the regulating fluid flow is air, as in internal combustion engine carburetors, the opposed walls of the conduit should be not more than .003 inch apart, and should preferably be approximately .002 inch apart, since I have found that when the conduit walls are spaced apart more than .003 inch, the air flow changes from laminar to turbulent, and is no longer affected by changes in the viscosity and temperature of the air.

An object of the present invention is to provide an improved carburetor for an internal combustion engine.

Another object is to provide improved apparatus for measuring the rate of flow of a fluid of variable density.

A further object is to provide improved apparatus for measuring the flow of a fluid of variable density utilizing a restriction of such dimensions that the flow therethru is substantially affected by variations in viscosity and hence by variations in the temperature of the fluid.

Other objects and advantages of the present invention will become apparent from a consideration of the appended specification, claims and drawings, in which:

Figure 2 shows in detail a density responsive valve such as the one used in the carburetor of Figure 1.

Figure 3 is an enlarged view of the valve structure itself,

Figure 1:
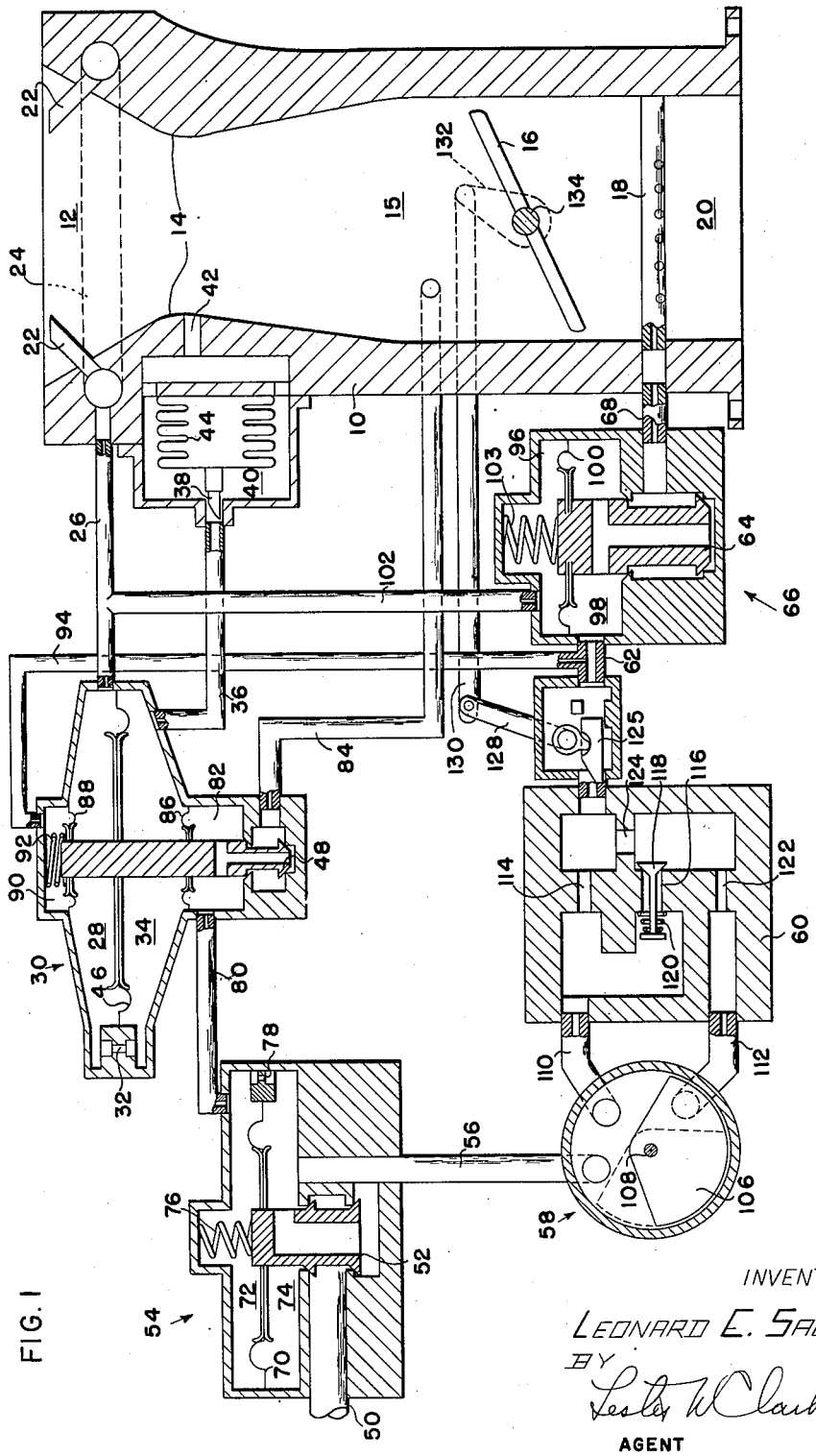
Figure 1 is a somewhat diagrammatic illustration of a carburetor for an internal combustion engine embodying the principles of my invention.

Figure 4 is a view taken on the line 4—4 of Figure 3, looking in the direction of the arrow, but on a smaller scale than Figure 3, Figure 5 is an enlarged end view of the valve of Figure 3, and Figures 6 and 7 illustrate two alternative forms of the parallel valve and fixed orifice construction which may be used in place of the valve in Figures 3 and 4.

Referring to Figure 1, there is shown a body 10 of a carburetor for an aircraft type internal combustion engine. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of air passing thru the restriction. Since the cross-sectional area of the venturi is constant, this pressure differential may be taken as a measure of the volume of air flowing thru the passage per unit time.

In order to obtain a pressure differential varying as a function of the mass of air per unit time flowing thru the venturi 14, the pressure differential between entrance 12 and the throat of venturi 14 is utilized to crease an air flow thru a secondary air passage extending from entrance 12 to the throat of venturi 14. A plurality of impact tubes 22 are provided, whose open ends project into the entrance 12 to receive the impact of the entering air. The secondary air passage may be traced from entrance 12 thru tubes 22, a passage 24 interconnecting the impact tubes, a conduit 26, a chamber 28 in a pressure meter generally indicated at 30, a restriction 32, a chamber 34 in the pressure meter 30, a conduit 36, past a valve 38 into a chamber 40, and thru a conduit 42 to the throat of venturi 14.

A valve 38 is operated by a bellows 44. The valve 38 and bellows 44 are shown in greater detail in Figure 2. There it may be seen that one end of bellows 44 is sealed to the inner rim of a cup member 46. The other end of bellows 44 is closed by a plate member 48. The space enclosed by the bellows 44, cup member 46 and plate 48 may be filled partly with a suitable oil and the remainder with a fluid having an appreciable coefficient of thermal expansion, such as nitrogen. A projection 49 at the center of plate 48 abuts against a disc 47 on the end of the stem 45 of valve 38. A spring 43 holds the disc 47 in engagement with the projection 49.

Referring to Figure 3, where the valve structure is shown on an enlarged scale, it may be seen that the valve 38 is contoured, as shown at 41, by having several flat slabs ground on an originally cylindrical surface. In addition to these flat slabs the surface of the active portion of valve 38 is turned down, as indicated at 39, so that it is approximately .002 of an inch smaller in radius than the stem of valve 45. The seat with which the valve 38 cooperates is dimensioned to fit closely the larger outer diameter of stem 45. Therefore, it may be seen that the opening around valve 38, in the position shown in Figure 3, is that illustrated in Figure 4, which is a cross-sectional view taken on the lines 4—4 of Figure 3, looking in the direction of the arrows.

It may be seen that this open area consists of a segmental portion A, whose area varies with the position of valve 38, and an annular portion B, whose area is substantially constant over the greater part of the operating range of valve 38.

The area A is varied by the action of the bellows 44. As the pressure acting on the bellows increases or the temperature decreases, the bellows contracts, tending to increase the area A and hence to increase the air flow thru the valve. The area B is not varied appreciably by the movement of the valve. However, by reason of the choice of dimensions of the area B, which is hereinafter referred to as the fixed orifice portion of the valve, the velocity of flow therethru is affected by variations in the temperature of the air. As the air temperature increases, its viscosity increases, and the velocity of flow of air thru the orifice portion B is reduced at an increasing rate of reduction. It may be seen that the constriction of the valve so as to provide the fixed area B in addition to the variable area A, is to increase the temperature sensitivity of the device.

Other equivalent forms of temperature compensating areas are shown in Figures 6 and 7. In those figures the areas A', A" correspond to the area A of Figure 4; the areas B', B" correspond to the area B of Figure 4. In the case of Figure 6, area B' is a simple elongated slot. In Figure 7, the area B" is an annular slot. It is believed, however, that the valve construction illustrated in Figures 3, 4, and 5 is easier to manufacture than the arrangements shown in Figures 6 and 7, and is for that reason to be preferred.

In the carburetor of Figure 1, the total pressure differential between the entrance 12 and the throat of venturi 14 is a measure of the volume of air entering the carburetor per unit time. In the secondary air passage previously traced, this total air pressure differential is divided into two component pressure drops, one across the restriction 32 and the other across valve 38. The valve 38 is moved toward open position as the air pressure increases and toward closed position as the air pressure decreases. If the volume of air flowing per unit time thru passage 15 remains constant while its density decreases, then the mass of air flowing is decreased, but the pressure differential set up by the venturi 14 remains constant. However, the movement of valve 38 toward closed position causes the component pressure drop across valve 38 to increase, and the component pressure drop across restriction 32 to decrease proportionately, reflecting the decrease in the mass of air flowing per unit time. The use of the fixed orifice area B in parallel with the variable orifice A of the valve gives an effect of additional response of the valve to temperature variation because of the laminar flow through orifice B. By proper design of valve 38, the pressure drop across restriction 32 may be made to vary substantially in accordance with the mass of air flowing thru passage 15. This pressure differential across restriction 32 acts on a diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure. It flows thru a conduit 50, a valve 52 in a pressure regulator generally indicated at 54, a conduit 56, a mixture control unit generally indicated at 58, a jet system 60, past an idle valve 125, thru a conduit 62, a valve 64 in a second pressure regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the pressure meter 30, past the valve 48, and thru a conduit 84 to the main air passage 15.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54.

The position of diaphragm 70 and valve 52 is determined by the balance between the pressure in chamber 74 acting in a valve closing direction and the spring 76 plus the pressure in chamber 72 acting in a valve opening direction. If the balance between these forces is upset, the diaphragm 70 and valve 52 move until the balance is restored. Therefore the pressure in chamber 72 is a measure of the pressure in chamber 74, which is substantially the same as the pressure on the upstream side of the jet system 60. For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60 and thereby to prevent variations in pressure at the fuel discharge nozzle 18, which may be due, for example, to operation of the throttle or to variations in engine speed, from reaching the downstream side of the jet system and affecting the fuel flow.

The pressure regulator 66 includes a pair of expansible chambers 96 and 98 separated by a flexible diaphragm 100, which is attached at its center to the valve 64. A spring 103 biases the valve 64 toward closed position. The chamber 96 is connected thru a conduit 102 to the conduit 26 and thence thru the passage 24 and impact tubes 22 to the air entrance 12. The chamber 98 is connected to the conduit 62.

The mixture control 58 includes a disc valve 106 fixed on a shaft 108. The disc valve 106 controls the flow of fuel thru ports opening into conduits 110 and 112 which lead into the jet system 60. When the disc 108 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by an enrichment valve 118 biased to closed position by a spring 120. The conduit 112 conducts fuel to a fixed restriction 122. Fuel flowing thru the restrictions 116 and 122 also flows thru another restriction 124 which limits the total flow thru restrictions 116 and 122.

The valve 118 is normally closed, but opens at high pressure differentials across the jet system to increase the fuel-to-air ratio under heavy load conditions.

At low air flows, such as are encountered under idling conditions, the pressure differential set up by the venturi 14 tends to be erratic, and is not a reliable indication of the volume of air entering the engine. Provision is made to control the fuel flow directly in accordance with the throttle position at such times. The spring 92 in the pressure meter 30 acts on valve 48 in a closing direction. When the differential pressure acting on diaphragm 46 is small, as under low air flow conditions, the spring 92 becomes the predominating force acting on valve 48. The consequent closing movement of valve 48 causes an increase in the fuel flow thru the main fuel line, since closure of valve 48 increases the pressure in chamber 82 of pressure meter 30 and hence in chamber 72 of pressure regulator 54. Furthermore, the spring 76 of pressure regulator 54 biases valve 52 in an opening or fuel flow increasing direction.

The idle valve 125 is pivotally attached to a lever 128, whose opposite end is connected by a link 130 to an arm 132 fixed on the shaft 134 of throttle 16. The idle valve is normally wide open when the throttle is beyond a range of positions near its closed position, usually termed the idling range. As the throttle moves into the idling range, thereby decreasing the air flow, the idle valve 125 moves toward closed position. At the same time, the springs 92 and 76 cause operation of valve 52 in an opening direction. The valve 52 is thereby opened sufficiently so that its restrictive effect on the fuel flow is less than that of the idle valve 125. Therefore the fuel flow under idling conditions is controlled primarily by the valve 125 in accordance with the mass of air entering the engine.

Although I have illustrated a particular type of carburetor, it will be appreciated by those skilled in the art that my invention may be applied with equal facility to other types of carburetors. The carburetor illustrated may, for example, be modified by omitting the pressure regulator 54 and placing the valve 48 of the pressure meter 30 directly in the fuel line between the pump and the mixture control 58. If the carburetor is so modified, the valve 48 should be modified so that it is balanced against inlet pressure rather than discharge pressure, and so that it opens in a downward direction. The structure of valve 48 would then be similar to that of valve 52.

While I have shown and described certain preferred embodiments of my invention, other modifications thereof will readily occur to those skilled in the art, and I therefore intend my invention to be limited only by the appended claims.

I claim as my invention:

1. Valve mechanism for controlling the flow of elastic fluid thru a conduit in accordance with variations in density of said fluid, comprising a bellows filled with a substance having an appreciable coefficient of thermal expansion and exposed to said fluid so that variations in the pressure and temperature of said fluid cause expansion and contraction of said bellows, a valve operatively connected to said bellows to be positioned in accordance with the expansion and contraction thereof, a seat for said valve, a portion of said valve being contoured so as to vary the open area between said valve and seat in accordance with the position of said valve, and a second portion of said valve being contoured to provide between said valve and seat a constant clearance in all positions of said valve, said clearance being of such selected critical magnitude, in relation to predetermined values of velocity, density and viscosity of said fluid, as to determine a Reynolds number not exceeding 2000, whereby said flow is always laminar, and hence varies inversely with the viscosity of said fluid, which in turn varies directly with its temperature, so that said flow becomes increasingly smaller as said temperature increases, under all operating conditions of said mechanism.

2. Apparatus for controlling the flow of elastic fluid thru a conduit in accordance with variations in density of said fluid, comprising a bellows filled with a substance having an appreciable coefficient of thermal expansion and exposed to said fluid so that variations in the pressure and temperature of said fluid cause expansion and contraction of said bellows, a valve operatively connected to said bellows to be positioned in accordance with the expansion and contraction thereof, a seat for said valve, said valve being contoured to vary the open area between said valve and seat in accordance with the position thereof, and a pair of wall means forming a restriction connected in parallel with said open area, said wall means being spaced apart by a constant distance of such selected small magnitude, in relation to predetermined values of velocity, density and viscosity of said fluid, as to determine a Reynolds number not exceeding 2000, whereby said flow is always laminar, and hence varies inversely with the viscosity of said fluid which in turn increases directly with its temperature, which provides an increasingly reduced fluid flow as the temperature of said fluid increases, under all conditions of operation of said apparatus.

3. Fluid flow regulating apparatus responsive to variations in density of a flowing elastic fluid, comprising a conduit for said fluid, restriction means in said conduit comprising two parallel restricted flow paths, valve means for varying the area of one of said paths, a bellows responsive to the pressure and temperature of said fluid for operating said valve means, the other of said flow paths being formed by opposed walls spaced apart by such a selected, sufficiently small distance, in relation to predetermined values of velocity, density and viscosity of said fluid, as to determine a Reynolds number not exceeding 2000, whereby said flow is always laminar, and hence varies inversely with both the viscosity and the temperature of said fluid; the cross sections of said flow paths being so related that the total flow of fluid therethrough varies inversely both as its viscosity and its temperature, under all conditions of operation of said apparatus.

4. Air flow regulating apparatus responsive to variations in density of the flowing air, comprising a conduit for said air, restriction means in said conduit comprising two parallel restricted flow paths, valve means for varying the area of one of said paths, a bellows responsive to the pressure and temperature of said air for operating said valve means, the other of said flow paths being formed by walls spaced apart by such a selected distance of less than .003 of an inch, in relation to predetermined values of the density and viscosity of said fluid, as to determine a Reynolds number not exceeding 2000, whereby said flow is always laminar, and hence, varies inversely with both the viscosity and the temperature of said air; the cross sections of said flow paths being so related that the total flow of air therethrough varies inversely both as its viscosity and its temperature, under all conditions of operation of said apparatus.

5. Air flow regulating apparatus responsive to variations in density of the flowing air, comprising a conduit for said air, restriction means in said conduit comprising two parallel restricted flow paths, valve means for varying the area of one of said paths, a bellows responsive to the pressure and temperature of said air for operating said valve means, the other of said flow paths being formed by walls spaced apart by a distance of substantially .002 of an inch, so that the flow thru said other path is appreciably affected by variations in the viscosity and hence in the temperature of said air; the cross sections of said flow paths being so related that the total flow of fluid therethrough varies inversely as its viscosity.

6. Fluid flow regulating apparatus responsive to the variations in temperature of a continuously flowing elastic fluid having a known relationship between viscosity and temperature, comprising a conduit for said fluid having a continuously open inlet and a continuously open outlet, a restriction in said conduit, a pair of spaced wall means forming two opposite sides of said restriction, said wall means being spaced apart by such a selected, sufficiently small distance, in relation to predetermined values of velocity, density and viscosity of said fluid, as to determine a Reynolds number not exceeding 2000, whereby said flow is always laminar and hence varies inversely with both the viscosity and the temperature of said fluid, under all conditions of operation of said apparatus.

7. The method of controlling the flow of an elastic fluid in accordance with its density, characterized by passing said fluid through an orifice, varying a part of the flow area through said orifice directly with the pressure and inversely as the temperature of said fluid, and maintaining the remainder of said area at such a selected constant, small size, in relation to predetermined values of velocity, density and viscosity of said fluid, as to determine a Reynolds number not exceeding 2000, whereby said flow is always laminar, and hence varies inversely with both the viscosity and the temperature of said fluid, under all conditions of operation of said apparatus.

8. Apparatus for controlling the flow of an elastic fluid in accordance with variations in its density, comprising a valve whose opening varies inversely with the density of said fluid and a fixed restriction of such selected, constant, small size, in relation to predetermined values of velocity, density and viscosity of said fluid, as to determine a Reynolds number not exceeding 2000, whereby said flow is always laminar, and hence varies inversely with both the viscosity and the temperature of said fluid, under all conditions of operation of said apparatus.

9. Apparatus according to claim 8, in which the fixed restriction is concentric with the valve.

10. Apparatus according to claim 8, in which the fixed restriction is separate and connected in parallel with the valve.

11. A carburetor comprising a main air passage and a secondary air conduit in parallel therewith, means for supplying liquid fuel to said passage, restriction means in said conduit comprising two parallel restricted flow paths, valve means for varying the area of one of said paths, a bellows responsive to the pressure and temperature of said air for operating said valve means, the other of said flow paths being formed by opposed walls spaced apart by such a selected, sufficiently small distance, in relation to predetermined values of velocity, density and viscosity of said fluid, as to determine a Reynolds number not exceeding 2000, whereby said flow is always laminar, and hence varies inversely with both the viscosity and the temperature of said fluid, under all conditions of operation of said apparatus.

12. A carburetor comprising a main air passage and a secondary air conduit in parallel therewith, means for supplying liquid fuel to said passage, restriction means in said conduit comprising two parallel restricted flow paths, valve means for varying the area of one of said paths, a bellows responsive to the pressure and temperature of said air for operating said valve means, the other of said flow paths being formed by opposed walls spaced apart by such a selected, sufficiently small distance, in relation to predetermined values of velocity, density and viscosity of said fluid, as to determine a Reynolds number not exceeding 2000, whereby said flow is always laminar, and hence varies inversely with both the viscosity and the temperature of said fluid, under all conditions of operation of said apparatus.

LEONARD E. SAGER.

References Cited in the file of this patent

UNITED STATES PATENTS

| Number | Name | Date |
| --- | --- | --- |
| 1,604,672 | Albersheim et al. | Oct. 26, 1926 |
| 1,641,673 | Hall | Sept. 6, 1927 |
| 2,033,302 | Rockwell | Mar. 10, 1936 |
| 2,052,769 | Hoesel | Sept. 1, 1936 |
| 2,071,876 | Gordon | Feb. 23, 1937 |
| 2,318,228 | Jones | May 4, 1943 |
| 2,326,825 | Bucknam | Aug. 17, 1943 |
| 2,376,711 | Mock | May 22, 1945 |
| 2,382,050 | Gilbert | Aug. 14, 1945 |
| 2,393,144 | Chandler | Jan. 15, 1946 |
| 2,402,350 | Silver | June 18, 1946 |
| 2,440,942 | Gilbert | May 4, 1948 |
| 2,498,194 | Arthur | Feb. 21, 1950 |

FOREIGN PATENTS

| Number | Country | Date |
| --- | --- | --- |
| 217,334 | Switzerland | Feb. 2, 1942 |